United States Patent
Powell

(10) Patent No.: US 9,983,643 B2
(45) Date of Patent: May 29, 2018

(54) PROVIDING MULTIPLE POWER PATHS IN AN INTEGRATED CIRCUIT

(71) Applicant: Silicon Laboratories Inc., Austin, TX (US)

(72) Inventor: Matthew R. Powell, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 269 days.

(21) Appl. No.: 14/841,915

(22) Filed: Sep. 1, 2015

(65) Prior Publication Data

US 2017/0063229 A1    Mar. 2, 2017

(51) Int. Cl.

| | |
|---|---|
| *G05F 1/59* | (2006.01) |
| *G06F 1/26* | (2006.01) |
| *H02M 1/36* | (2007.01) |
| *H02M 3/00* | (2006.01) |
| *H02M 1/00* | (2006.01) |

(52) U.S. Cl.
CPC ................ *G06F 1/26* (2013.01); *G05F 1/59* (2013.01); *H02M 1/36* (2013.01); *H02M 3/00* (2013.01); *H02M 2001/0045* (2013.01)

(58) Field of Classification Search
CPC .. H02M 2001/0045; H02M 1/36; H02M 3/00; G05F 1/461; G05F 1/465; G05F 1/59; G06F 1/26
See application file for complete search history.

(56) References Cited

U.S. PATENT DOCUMENTS

| | | | |
|---|---|---|---|
| 8,026,636 B2* | 9/2011 | Oh ............................ | G05F 1/46 307/31 |
| 9,570,908 B2* | 2/2017 | Fernald ..................... | H02J 1/14 |
| 2010/0060078 A1* | 3/2010 | Shaw ........................ | G05F 1/56 307/31 |

OTHER PUBLICATIONS

Silicon Labs, "EFM32 . . . the world's most energy friendly microcontrollers. EFM32ZG108 Datasheet," EFM32ZG108FXX—d0063_Rev1.10, Mar. 6, 2015, 54 pages.

* cited by examiner

*Primary Examiner* — Patrick O'Neill
(74) *Attorney, Agent, or Firm* — Trop, Pruner & Hu, P.C.

(57) ABSTRACT

An integrated circuit includes: a voltage converter to receive a first supply voltage signal via a first power path and to output a first output voltage signal; and a voltage regulator to receive the first output voltage signal and to output a regulated voltage signal. The voltage regulator may further be configured to receive the first supply voltage signal via a second power path, and to selectively output the regulated voltage signal from one of the first supply voltage signal and the first output voltage signal.

16 Claims, 5 Drawing Sheets

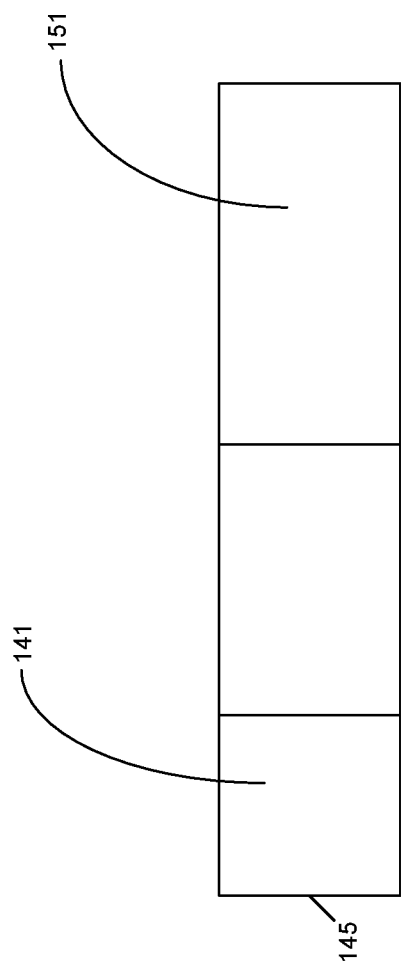

PROVIDING MULTIPLE POWER PATHS IN AN INTEGRATED CIRCUIT

BACKGROUND

Some integrated circuits (ICs) include many different configurable options. One configurable option is a configurable DC-DC voltage converter within the IC. In this way, a single IC can be designed and depending upon a given system in which the IC is used, a controllable voltage level can be generated by such DC-DC converter. However, given this configurability, the DC-DC converter upon system startup is not capable of correct operation. Often in a given system, one or more off-chip sources and on-chip sources may receive an output of such DC-DC converter. One solution to this problem is to provide a bypass path within the DC-DC converter such that an external battery voltage is available before the DC-DC converter is configured. However, internal and external components may not safely tolerate a full battery voltage.

SUMMARY OF THE INVENTION

In one aspect, an integrated circuit includes: a voltage converter to receive a first supply voltage signal via a first power path and to output a first output voltage signal; and a voltage regulator to receive the first output voltage signal and to output a regulated voltage signal. The voltage regulator may further be configured to receive the first supply voltage signal via a second power path, and to selectively output the regulated voltage signal from one of the first supply voltage signal and the first output voltage signal.

In an example, the voltage regulator includes: a first switch to receive the first supply voltage signal and controllable to output the regulated voltage signal therefrom; and a second switch to receive the first output voltage signal and controllable to output the regulated voltage signal therefrom.

In an example, a controller may selectively enable one of the first switch and the second switch. The controller may selectively enable the first switch when the integrated circuit is powered on and prior to the voltage converter being configured. The controller may selectively enable the second switch after the voltage converter is configured. In an example, the controller may access a non-volatile storage to obtain configuration information for the voltage converter and cause the voltage converter to be configured based at least in part on the configuration information. The controller may selectively disable the voltage regulator and enable the voltage converter to provide the first output voltage signal to the digital core after the voltage converter is configured.

In an example, the voltage regulator includes a comparator to compare a reference voltage to the regulated voltage, the comparator to output a gate signal based on the comparison, the gate signal to control at least the first switch.

In an example, the first power path includes one or more metal lines having a first width and formed on at least one layer of a semiconductor die, and the second power path includes one or more metal lines having a second width and formed on the at least one layer, the second width less than the first width, the second power path configured to handle a lower current consumption level than the first power path. The first switch may include a metal oxide semiconductor field effect transistor (MOSFET) having a first device size, and the second switch may include a second MOSFET having a second device size, the second device size greater than the first device size.

In one example, the voltage regulator includes first and second regulator circuits. The first regulator circuit may have: a first power gate to receive the first supply voltage signal and output the regulated voltage; a feedback circuit to compare the regulated voltage to a first reference voltage and to control the first power gate based on the comparison; and at least a first switch to disable the first regulator circuit after the voltage converter is configured. The second regulator circuit may have: a second power gate to receive the first output voltage signal and output the regulated voltage; a second feedback circuit to compare the regulated voltage to the first reference voltage and to control the second power gate based on the comparison; and at least a second switch to disable the second regulator circuit before the voltage converter is configured.

In another aspect, a method includes: receiving a supply voltage signal in a voltage regulator of an integrated circuit (IC) via an auxiliary power path; regulating the supply voltage signal to provide a regulated voltage from the voltage regulator to a digital circuit of the IC; configuring a DC-DC converter of the IC based on configuration information obtained from a non-volatile storage; receiving a second voltage signal in the voltage regulator, the second voltage signal received from an output of the DC-DC converter; and regulating the second voltage signal to provide the regulated voltage to the digital circuit.

In an example, the method further includes powering at least one component external to the IC via the output of the DC-DC converter, where the at least one component is not powered until the DC-DC converter is configured. The method also may include operating the digital circuit at a first current consumption level when the supply voltage signal is regulated to provide the regulated voltage, and operating the digital circuit at a second current consumption level when the second voltage signal is regulated to provide the regulated voltage, the second current consumption level greater than the first current consumption level. In an example, the method may further include accessing the non-volatile storage via the digital circuit to obtain the configuration information of the DC-DC converter, and sending the configuration information from the digital circuit to the DC-DC converter.

In yet a further aspect, an apparatus includes: a voltage converter to receive a supply voltage and to output a converted voltage via a first power path; a voltage regulator to receive the converted voltage from the voltage converter via the first power path and receive the supply voltage via a second power path, where the voltage regulator includes switching circuitry controllable to output the regulated voltage from a selected one of the supply voltage and the converted voltage; and a digital circuit to receive the regulated voltage.

In an example, the apparatus further includes a non-volatile memory, where the digital circuit is to access the non-volatile memory to obtain configuration information for the voltage converter and cause the voltage converter to be configured based at least in part on the configuration information. The switching circuitry of the voltage regulator may include: a first switch to disable a first power gate coupled to receive the supply voltage when the voltage converter is configured; and a second switch to disable a second power gate coupled to receive the converted voltage when the voltage converter is not configured.

BRIEF DESCRIPTION OF THE DRAWINGS

FIG. 5 is a cross-sectional view of a representative layer of a semiconductor die.

DETAILED DESCRIPTION

In various embodiments, multiple independent power paths can be provided in an integrated circuit. These independent power paths may be provided from an external voltage supply source such as a battery to different power circuits of the IC. More specifically, a main power path can be provided from the external voltage source to an on-chip DC-DC converter that in turn outputs a downconverted voltage. This downconverted voltage is provided to, among other locations, one or more on-chip voltage regulators. In addition, an auxiliary power path can be provided from the external voltage source directly to at least one of the on-chip voltage regulators. In this way, before the DC-DC converter is fully configured, at least one voltage regulator and circuits supplied by the regulated voltage output by this voltage regulator can operate in a safe manner on IC power up.

Still further, in many cases, this auxiliary power path can be formed of lower cost, lower complexity circuitry, since in this startup mode, low current consumption requirements are present, given that minimal circuitry of the integrated circuit may be powered on or operating. As such, the cost and complexity of this secondary path can be reduced.

Figure 1:
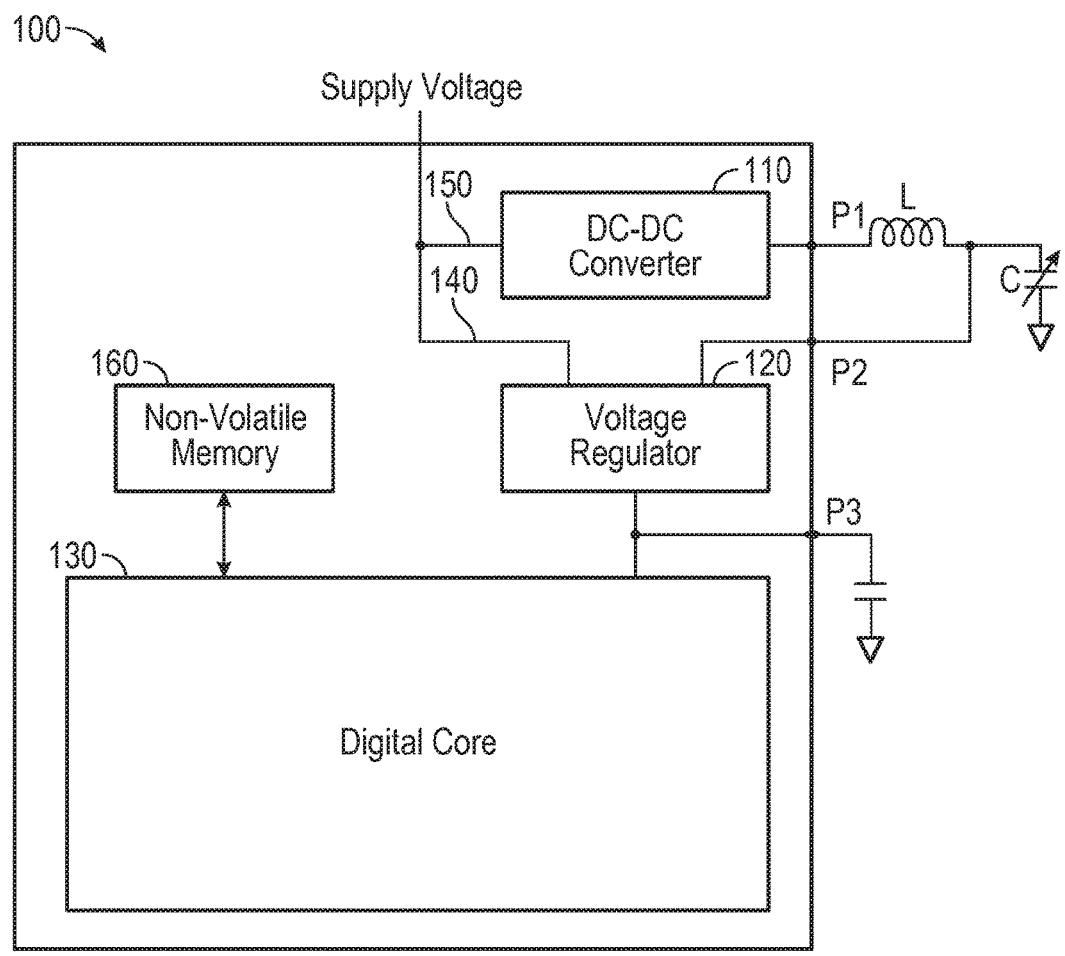
FIG. 1 is a block diagram of a high level view of a MCU according to one embodiment.

Referring now to FIG. 1, shown is a block diagram of a high level view of a MCU according to one embodiment. As seen in FIG. 1, MCU 100 includes various components, including a DC-DC converter 110, a voltage regulator 120, a digital core 130, and a non-volatile memory 160. MCU 100 is coupled to receive a supply voltage input from a supply voltage of a system in which it is incorporated. Representative systems incorporating MCU 100 may be a given low power system such as a distributed intelligence device, a sensor device, a short-range wireless device, a network device, a wearable device or so forth. In such systems, the supply voltage may take the form of a battery such as a rechargeable battery. In some examples, this battery supply may have a voltage between approximately 2.5-5.0 volts.

In many instances, DC-DC converter 110 may be implemented as a downconverting converter, such as a buck converter. As an example, assume a supply voltage input greater than at least 2.0 volts. Depending upon the particular system in which MCU 100 is incorporated, DC-DC converter 110 may be configured to downconvert this incoming voltage to a voltage level of 1.8 volts (which as used herein is also termed a high voltage (HV)) or 1.2 volts (also termed herein a low voltage (LV)). The configuration of DC-DC converter 110 determines whether output is at a HV or LV level, and depends on customer cost/power sensitivity and a power profile of a particular system in which MCU 100 is incorporated. For example, for an MCU having radio circuitry (for wireless communication), analog radio frequency (RF) power consumption may dictate a 1.8V output, while digital intensive applications may use a 1.2V output. The choice may further depend on one or more other components of a system off-chip from MCU 100 which may be powered by the output of DC-DC converter 110.

To enable flexible incorporation of MCU 100 into a variety of different customer systems having different power requirements, upon startup of the MCU (such as on powering on of the customer system), the supply voltage input (which may be coupled to a battery or other power supply of the system) may be provided directly to voltage regulator 120, which is controlled on startup to operate directly using this supply voltage. Note at this phase of operation, DC-DC converter 110 is not yet configured and is thus not able to output a correct downconverted voltage. In different embodiments, voltage regulator 120 may be configured as a low dropout (LDO) regulator or other linear regulator.

A second power rail 140 (also referred to herein as a power path) is coupled to provide the supply voltage input directly to voltage regulator 120. Note that power rail 140 in various embodiments may be a relatively low power rated power path, in that during a startup phase of operation in which voltage regulator 120 uses the supply voltage provided directly to it, relatively little current is consumed by circuitry of the MCU.

For example, in startup operation, the clock frequency used in digital core 130 may be much lower than a maximum rated frequency and most resources within this digital core and a remainder of the integrated circuit are not in use. As a result, current consumption of digital core 130 may be 10× less than maximum rated current consumption during normal operation. As such, second power rail 140 can be designed and manufactured to handle relatively low current consumption, and thus the real estate and manufacturing costs of such power rail can be relatively low. Although examples are not limited in this regard, in a particular embodiment, second power rail 140 may be rated to accommodate a current level on the order of between approximately 10-20 milliamperes (mA). As such, metal routing lines of second power rail 140 within one or more layers of a semiconductor die that forms MCU 100 can be of relatively minimal width of FIG. 5, which is a cross-sectional view of a representative layer of a semiconductor die, as shown, for example, at metal line 141 within layer 145. Thus with a minimal size, routing congestion is eased, and any semiconductor devices along the path that provides the supply voltage can be of lesser size and complexity. Still further, with a reduced size power path, there is reduced impedance that could cause an undesired voltage drop.

Still with reference to FIG. 1, after this startup phase of operation, various components of MCU 100, including DC-DC converter 110 are fully configured. In this instance, a downconverted voltage is provided to voltage regulator 120 via the output of DC-DC converter 110, which itself receives the supply voltage input via a first power rail 150. Note that this first power rail may be a higher power rated power path, in that during normal operation higher current consumption can be expected, and thus first power rail 150 is configured to handle this higher current consumption. Although examples are not limited in this regard, in a particular embodiment, first power rail 150 may be rated to accommodate a current level on the order of between approximately 100-150 mA. As such, metal routing lines of first power rail 150 within one or more layers of the semiconductor die of MCU 100 can be of larger width than of second rail 140 as shown, for example, at metal line 151 within layer 145 of FIG. 5. By providing two power paths, one of which having lower current handling capabilities, greatly reduced area and routing complexity are realized. In the example described herein where second power rail 140 is capable of handling approximately 20 mA and first power rail 150 is capable of handling approximately 100 mA, the size of second power rail 140 can be approximately 20% of the size of first power rail 150. Understand that the entire power path from supply voltage input pin to DC-DC converter 110 and in turn from voltage regulator 120 may be termed the "first power path," and which may correspond to a main power path. And in this example, only the portion of the power path that deviates from the input path to DC-DC converter 110 to the input of voltage regulator 120 may be termed the "second power path," and which may correspond to a secondary or auxiliary power path.

With further reference to FIG. 1, note that the converted voltage output from DC-DC converter 110 may be communicated off-chip via a first pin P1 and communicated back on chip via a second pin P2. In this way, this converted voltage may be provided to one or more other components of a customer system. As further illustrated in FIG. 1, a load circuit having a LC network formed of a series inductor L and a capacitor C is coupled to P1. In the embodiment shown, capacitor C1 is a variable capacitance. This variable capacitance represents that in different customer systems, the value of the capacitance can vary. For example, in different systems capacitor C may be between approximately 1.0 and 10 microFarads. To this end, configuring DC-DC converter 110 in part includes configuring the appropriate operating parameters for the converter such as filter parameters of a feedback loop circuit of the converter, given the variable LC network coupled to its output.

Note that in other embodiments, DC-DC converter 110 may provide power to digital core 130 directly once it is powered up. In such configuration, P2 may be left floating or tied directly to the DC-DC input voltage and the DC-DC output connects instead to P3 to be provided as the supply voltage to digital core 130.

Digital core 130 may include various hardware circuitry to execute instructions, including startup instructions such as firmware instructions, e.g., of a basic input output system (BIOS) or another firmware. To this end, digital core 130 is in communication with non-volatile memory 160, which in an embodiment may be implemented as a flash memory, one time programmable (OTP) memory or other persistent storage. Upon startup of MCU 100 and by provision of the supply voltage directly to voltage regulator 120 and corresponding supply of a regulated voltage to digital core 130, logic within digital core 130 may access non-volatile memory 160 to obtain startup instructions used to configure the various components of MCU 100. Understand that while shown at this high level in the illustration of FIG. 1, many variations and alternatives are possible. Further, while the integrated circuit described in FIG. 1 is a MCU for ease of illustration, embodiments apply equally to other types of ICs.

Figure 2A:
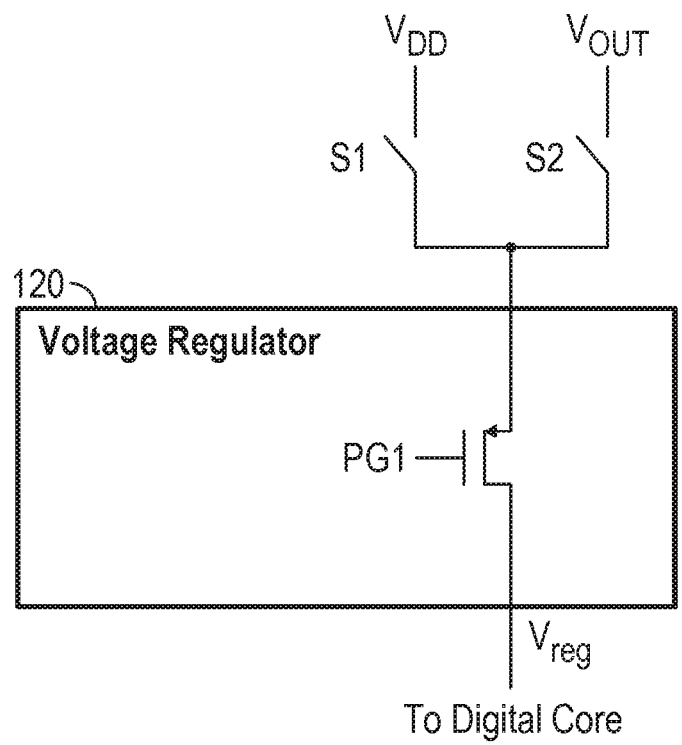
FIG. 2A is a schematic diagram of input paths to a voltage regulator in accordance with one embodiment.

Referring now to FIG. 2A, shown is a schematic diagram of input paths to a voltage regulator in accordance with one embodiment. As shown in FIG. 2A, regulator 120 includes a power gate PG1, which in the embodiment shown is implemented as a P-channel metal oxide semiconductor field effect transistor (pMOSFET). Understand that regulator 120 includes additional circuitry not shown in FIG. 2A, including a feedback loop to control the regulated voltage to be output by the regulator. In the embodiment of FIG. 2A, two upstream switches S1 and S2 are provided. In different implementations, these switches also may be implemented as MOSFETs. Switch S1 may be coupled to second power rail 140, which as discussed above is a lower power (lower current consumption) power path and as such switch S1 can be formed as a switching device of lower real estate (e.g., a smaller sized MOSFET) and complexity. In contrast, switch S2 may be coupled to first power rail 150 and is a switching device having higher power consumption. Thus depending on which voltage couples to the source terminal of PG1, voltage regulator 120 operates to output a regulated voltage of a predetermined level from the received voltage (e.g., a 1.8V input that the regulator drops to a regulated 1.2V level). Note that the implementation of FIG. 2A may be inefficient from an area impact given this series path to voltage regulator 120, and further given that during normal operation the main path traverses two switching devices (S2 and PG1). As such, in other cases a voltage regulator may include parallel regulation devices to enable a lower cost lower power path through the voltage regulator.

Figure 2B:
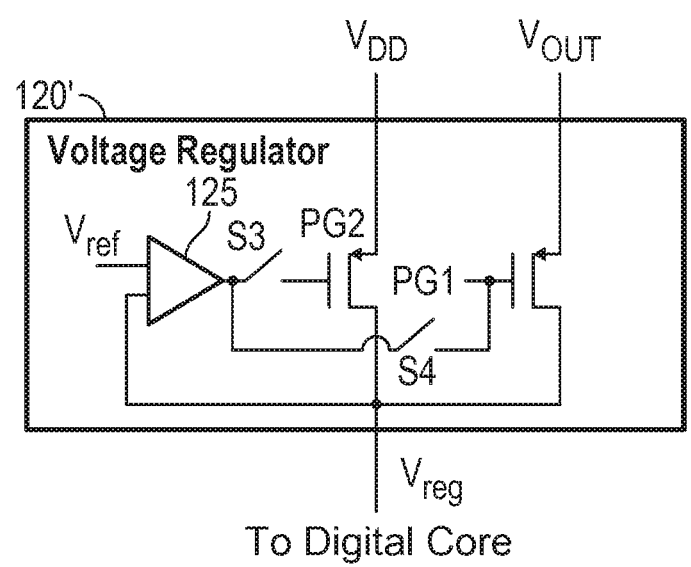
FIG. 2B is a schematic diagram of a voltage regulator in accordance with an embodiment.

A more efficient implementation can be realized using multiple parallel regulation devices. Referring now to FIG. 2B, shown is a schematic diagram of a voltage regulator in accordance with another embodiment. As seen in FIG. 2B, voltage regulator 120' includes multiple power gates PG1 and PG2, both formed as PMOS devices. In this implementation however, while PG1 may be a relatively large device capable of handling higher current consumption, second power gate PG2 may be a smaller device to handle the lower current consumption for a supply voltage received via second power rail 140. Continuing with the above example, PG2 may be 20% of the size of PG1.

FIG. 2B further shows details of the voltage regulator. Specifically, a feedback circuit includes a comparator 125 (which can be implemented as an op amp) coupled to receive an incoming reference voltage Vref, which may be obtained from a given on-chip source such as a bias circuit. Comparator 125 compares this reference voltage to a feedback voltage corresponding to the regulated output of the active power gate to thus the control the respective power gate. Note further the presence of switches S3 and S4. These switches enable or disable the corresponding power gate depending upon phase of operation. That is, during a startup phase switch S4 may be open such that power gate PG1 is disabled and switch S3 closed such that power gate PG2 is enabled. Instead after appropriate configuring of the upstream DC-DC converter (not shown for ease of illustration in FIG. 2B), switches S3 and S4 may be oppositely controlled to disable power gate PG2 and enable power gate PG1. Note in some cases, additional switches may be present to tie the gate of PG1 (and/or PG2) high when disabled.

Note that in the configurations of FIGS. 2A and 2B, the various switches may be hardwired such that upon reset, the active power path is second power rail 140 that provides the full supply voltage to voltage regulator 120. In this way, safe operation is guaranteed on startup. For example, external components of the system that receive a converted voltage from DC-DC converter 110 do not receive a supply voltage level (bypassed by DC-DC converter 110) on startup. Instead, until DC-DC converter 110 is appropriately configured and operating normally, no output is available and thus off-chip components (as well as any on-chip components that receive the output of DC-DC converter 110) are guaranteed to receive a safe voltage level.

Figure 2C:
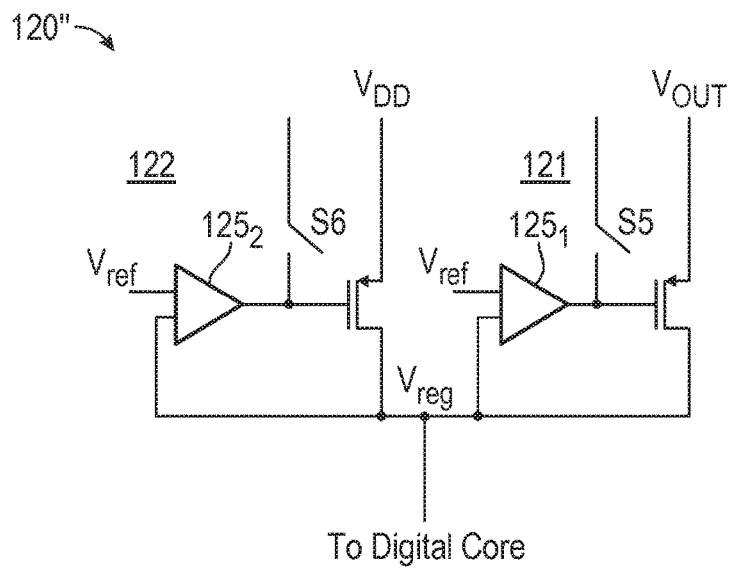
FIG. 2C is a schematic diagram of a voltage regulator in accordance with another embodiment.

In yet other implementations multiple voltage regulators may be provided, one of which is associated with the low power power path and the other associated with the high power path. Referring now to FIG. 2C, shown is a schematic diagram of multiple voltage regulators in accordance with another embodiment. As shown in FIG. 2C, voltage regulators 121 and 122 may be of a consolidated voltage regulator 120". Here, voltage regulator 121 is a high power regulator, having a corresponding power gate PG1 and comparator 125₁ controlled when enabled by switch S5. In turn, voltage regulator 122 having a corresponding power gate PG2 and comparator 125₂ is a low power regulator enabled, e.g., during the startup phase, when enabled by switch S6. Understand while shown with these particular implementations in FIG. 2A-2C, other arrangements of voltage regulators are possible. For example, more or less portions of the analog circuit block (e.g., comparator 125 in FIG. 2B) can be shared between the two loops, i.e., there are intermediary options between FIGS. 2B and 2C that a skilled artisan may contemplate.

Figure 3:
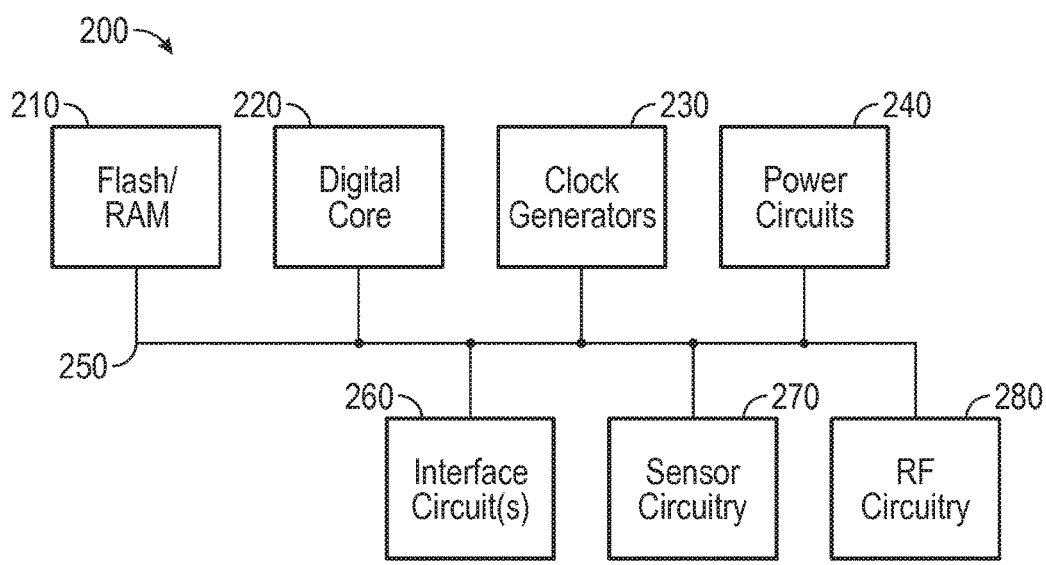
FIG. 3 is a block diagram of representative MCU which may include multiple power paths as described herein.

Referring now to FIG. 3, shown is a block diagram of a representative MCU 200 which may include multiple power paths as described herein. In the embodiment shown in FIG. 3, MCU 200 may be, e.g., a 32-bit MCU that can be used for a variety of use cases, including sensing, monitoring, embedded applications, communications, applications and so forth. In the embodiment shown, MCU 200 includes a memory system 210 which in an embodiment may include a non-volatile memory such as a flash memory and volatile storage, such as RAM. Memory system 210 couples via a bus 250 to a digital core 220, which may include one or more cores and/or microcontrollers that act as a main processing unit of the MCU. In turn, digital core 220 may couple to clock generators 230 which may provide one or more PLLs or other clock generation circuitry to generate various clocks for use by circuitry of the MCU.

As further illustrated, MCU 200 further includes power circuitry 240. Such power circuits may include a configurable DC-DC converter and one or more voltage regulators as described herein. To this end, multiple power paths, including at least a main path and an auxiliary path, can be provided from an off-chip power source such as a battery to the components of power circuitry 240, as described herein. As further illustrated in FIG. 3, additional circuitry may optionally be present depending on particular MCU implementation to provide various functionality and interaction with external devices. Such circuitry may include interface circuitry 260 which may provide interface with various off-chip devices, sensor circuitry 270 which may include various on-chip sensors including digital and analog sensors to sense desired signals or so forth. In addition as shown in FIG. 3, RF circuitry 280 may be provided which may include analog circuitry of a transceiver to enable transmission and receipt of wireless signals, e.g., according to one or more of a local area or wide area wireless communication scheme, such as Zigbee, Bluetooth, IEEE 802.11, cellular communication or so forth. Understand while shown with this high level view, many variations and alternatives are possible.

Figure 4:
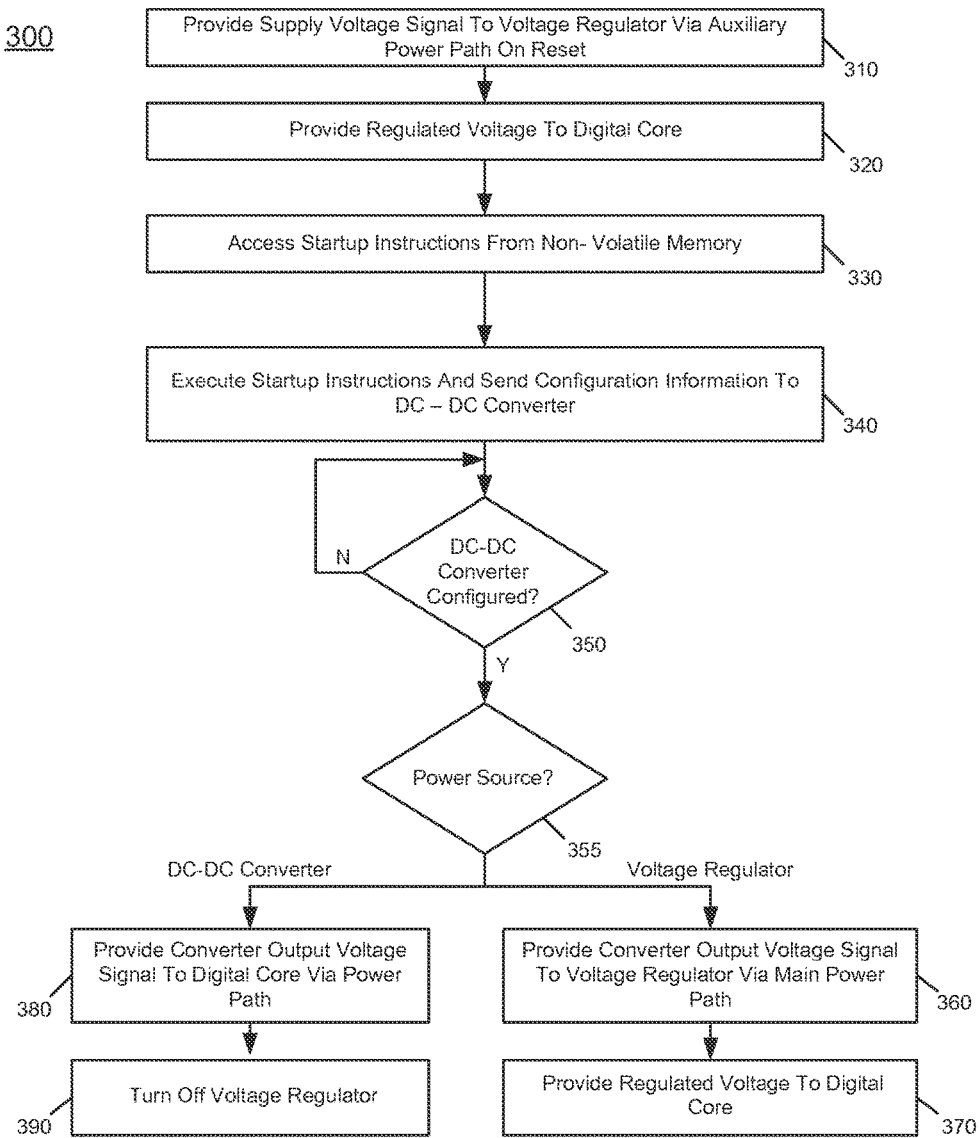
FIG. 4 is a flow diagram of a method in accordance with an embodiment.

Referring now to FIG. 4, shown is a flow diagram of a method in accordance with an embodiment. As shown in FIG. 4, method 300 provides a method for configurably operating an IC using a selected one of multiple power paths. In embodiments, method 300 may be performed by hardwired circuitry of the IC, as well as responsive to execution of instructions stored in a non-transitory storage, such as an on-chip non-volatile memory.

Method 300 begins by providing a supply voltage signal to a voltage regulator via an auxiliary power path on reset (block 310). As above in FIG. 1, this auxiliary power path may be second power rail 140 such that the supply voltage is provided directly to regulator 120. At block 320 the voltage regulator may provide a regulated voltage from this supply voltage to a digital core. This digital core may thus startup and access startup instructions stored in a non-volatile memory (block 330). These startup instructions may provide for accessing of configuration information of a DC-DC converter and sending the configuration information to the converter to enable it to be configured for particular operation in the given system (block 340). Next at diamond 350 it is determined whether the converter has been appropriately configured. This determination may simply be waiting a predetermined amount of time. Or, a measurement can be made of the output voltage from the converter to determine whether it is operating to output the correct voltage. In any event, control passes from diamond 350 when it is determined that the converter is appropriately configured to diamond 355. There it is determined whether the configuration of the IC is to thereafter power the digital core with the voltage regulator output or the DC-DC converter output.

If the determination is that the voltage regulator output is to power the core, control passes to block 360. At block 360, the DC-DC converter output signal may be provided to the voltage regulator via a main power path. Thus at this point normal system operation may occur and the output of the DC-DC converter can be used by the voltage regulator to provide a regulated voltage that can be used to power various circuitry of the IC, including the digital core (block 370).

Instead if the configuration is for the DC-DC converter output to directly power the digital core, control passes to block 380 where the converter output voltage signal is provided to the digital core via a power path (which may be some or all of the main power path or additional portions of a power path from the DC-DC converter to the digital core). Understand that in different implementations, a DC-DC converter may output a voltage slightly higher than the regulator target. In other implementations, the DC-DC converter may be controlled to operate in a duty cycle mode. In either case, control passes to block 390 where the voltage regulator may be turned off. As such, power is provided directly to the digital core in full power mode in this instance from the DC-DC converter. Understand while shown at this high level in the illustration of FIG. 4, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An integrated circuit comprising:
   a voltage converter to receive a first supply voltage signal via a first power path and to output a first output voltage signal, the first power path comprising one or more metal lines having a first width and formed on at least one layer of a semiconductor die;
   a voltage regulator to receive the first output voltage signal and to output a regulated voltage signal, the voltage regulator further to receive the first supply voltage signal via a second power path, the second power path comprising one or more metal lines having a second width and formed on the at least one layer, the second width less than the first width, the second power path configured to handle a lower current consumption level than the first power path, wherein the voltage regulator is configured to selectively output the regulated voltage signal from one of the first supply voltage signal and the first output voltage signal; and a controller to control the voltage converter, wherein the controller is to access a non-volatile storage to obtain configuration information for the voltage converter and cause the voltage converter to be configured based at least in part on the configuration information.

2. The integrated circuit of claim 1, wherein the voltage regulator comprises:
a first switch to receive the first supply voltage signal and controllable to output the regulated voltage signal therefrom; and
a second switch to receive the first output voltage signal and controllable to output the regulated voltage signal therefrom.

3. The integrated circuit of claim 2, wherein the controller is to selectively enable one of the first switch and the second switch.

4. The integrated circuit of claim 3, wherein the controller is to selectively enable the first switch when the integrated circuit is powered on and prior to the voltage converter being configured.

5. The integrated circuit of claim 4, wherein the controller is to selectively enable the second switch after the voltage converter is configured.

6. The integrated circuit of claim 3, wherein the controller is to selectively disable the voltage regulator and enable the voltage converter to provide the first output voltage signal to a digital core after the voltage converter is configured.

7. The integrated circuit of claim 2, wherein the voltage regulator comprises a comparator to compare a reference voltage to the regulated voltage, the comparator to output a gate signal based on the comparison, the gate signal to control at least the first switch.

8. The integrated circuit of claim 2, wherein the first switch comprises a metal oxide semiconductor field effect transistor (MOSFET) having a first device size, and the second switch comprises a second MOSFET having a second device size, the second device size greater than the first device size.

9. The integrated circuit of claim 1, wherein the voltage regulator comprises:
a first regulator circuit having:
a first power gate to receive the first supply voltage signal and output the regulated voltage;
a feedback circuit to compare the regulated voltage to a first reference voltage and to control the first power gate based on the comparison; and
at least a first switch to disable the first regulator circuit after the voltage converter is configured; and
a second regulator circuit having:
a second power gate to receive the first output voltage signal and output the regulated voltage;
a second feedback circuit to compare the regulated voltage to the first reference voltage and to control the second power gate based on the comparison; and
at least a second switch to disable the second regulator circuit before the voltage converter is configured.

10. The integrated circuit of claim 1, wherein the voltage converter comprises a downconverting converter, and wherein the first output voltage signal is at a lower voltage than the first supply voltage signal.

11. The integrated circuit of claim 10, wherein the first output voltage signal is to couple to one or more components of a system external to the integrated circuit.

12. A method comprising:
receiving a supply voltage signal in a voltage regulator of an integrated circuit (IC) via an auxiliary power path;
regulating the supply voltage signal to provide a regulated voltage from the voltage regulator to a digital circuit of the IC;
configuring a DC-DC converter of the IC based on configuration information obtained from a non-volatile storage;
receiving a second voltage signal in the voltage regulator, the second voltage signal received from an output of the DC-DC converter;
regulating the second voltage signal to provide the regulated voltage to the digital circuit;
operating the digital circuit at a first current consumption level when the supply voltage signal is regulated to provide the regulated voltage; and
operating the digital circuit at a second current consumption level when the second voltage signal is regulated to provide the regulated voltage, the second current consumption level greater than the first current consumption level.

13. The method of claim 12, further comprising powering at least one component external to the IC via the output of the DC-DC converter, wherein the at least one component is not powered until the DC-DC converter is configured.

14. The method of claim 12, further comprising:
accessing the non-volatile storage via the digital circuit to obtain the configuration information of the DC-DC converter; and
sending the configuration information from the digital circuit to the DC-DC converter.

15. An apparatus comprising:
a voltage converter to receive a supply voltage and to output a converted voltage via a first power path comprising one or more metal lines having a first width and formed on at least one layer of a semiconductor die;
a voltage regulator to receive the converted voltage from the voltage converter via the first power path and receive the supply voltage via a second power path comprising one or more metal lines having a second width and formed on the at least one layer, the second width less than the first width, the second power path configured to handle a lower current consumption level than the first power path, wherein the voltage regulator comprises switching circuitry controllable to output the regulated voltage from a selected one of the supply voltage and the converted voltage; and
a digital circuit to receive the regulated voltage.

16. The apparatus of claim 15, further comprising a non-volatile memory, wherein the digital circuit is to access the non-volatile memory to obtain configuration information for the voltage converter and cause the voltage converter to be configured based at least in part on the configuration information.

* * * * *